US008140058B2

(12) United States Patent
Park (10) Patent No.: US 8,140,058 B2
(45) Date of Patent: Mar. 20, 2012

(54) METHOD OF TRANSMITTING AND RECEIVING INTERNET ADDRESS IN MOBILE COMMUNICATION TERMINAL

(75) Inventor: Yeon-Woo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 1052 days.

(21) Appl. No.: 11/779,175

(22) Filed: Jul. 17, 2007

(65) Prior Publication Data

US 2008/0220748 A1 Sep. 11, 2008

(30) Foreign Application Priority Data

Mar. 8, 2007 (KR) ........................ 10-2007-0022867

(51) Int. Cl.
*H04M 3/42* (2006.01)
(52) U.S. Cl. ...................... 455/414.1; 455/466; 455/566; 455/412.1; 455/412.2; 455/550.1; 709/203; 370/328; 370/338; 370/349
(58) Field of Classification Search ............... 455/414.1, 455/466, 566, 412.1–412.2, 422.1, 517; 370/328, 370/338, 349; 709/203, 219, 246
See application file for complete search history.

(56) References Cited

U.S. PATENT DOCUMENTS

| 2001/0021649 | A1* | 9/2001 | Kinnunen et al. | 455/412 |
| 2002/0026500 | A1* | 2/2002 | Kanefsky et al. | 709/219 |
| 2008/0059906 | A1* | 3/2008 | Toki | 715/810 |

FOREIGN PATENT DOCUMENTS

| KR | 10-2004-0010909 A | 2/2004 |
| KR | 10-2004-0085955 A | 10/2004 |
| KR | 10-2005-0053067 A | 6/2005 |
| WO | WO 01/22680 A2 | 3/2001 |

OTHER PUBLICATIONS

Nokia, "Nokia 7710: Creating MMS Content", Version 1.0, pp. 1-32, May 24, 2005, XP-002611958.

\* cited by examiner

*Primary Examiner* — Kamran Afshar
*Assistant Examiner* — Babar Sarwar
(74) *Attorney, Agent, or Firm* — Birch, Stewart, Kolasch & Birch, LLP (57) ABSTRACT

A mobile terminal communication method including accessing a Web page of a specific Internet address using a web browser on a first mobile terminal, entering a message input screen on which information related to the specific Internet address is automatically displayed, and transmitting a message including the information related to the specific Internet address to at least a second mobile terminal.

26 Claims, 12 Drawing Sheets

METHOD OF TRANSMITTING AND RECEIVING INTERNET ADDRESS IN MOBILE COMMUNICATION TERMINAL

This nonprovisional application claims priority under 35 U.S.C. §119(a) on Patent Application No. 10-2007-0022867 filed in Republic of Korea on Mar. 8, 2007, the entire contents of which are hereby incorporated by reference.

BACKGROUND OF THE INVENTION

1. Field of the Invention

The present invention relates to a mobile communication terminal, and more particularly, to a method of transmitting and receiving Internet addresses between mobile communication terminals.

2. Discussion of the Related Art

Mobile communication terminals now include the capability of accessing the Internet through a wireless communication method. However, a user is generally limited to only viewing information on the website of the corresponding Internet address.

SUMMARY OF THE INVENTION

Accordingly, one object of the present invention is to address the above-noted and other problems.

Another object of the present invention is to provide a method of transmitting and receiving information about an Internet address between mobile communication terminals.

To achieve these and other advantages and in accordance with the purpose of the present invention, as embodied and broadly described herein, the present invention provides in one aspect a mobile terminal communication method, which includes accessing a Web page of a specific Internet address using a web browser on a first mobile terminal, entering a message input screen on which information related to the specific Internet address is automatically displayed, and transmitting a message including the information related to the specific Internet address to at least a second mobile terminal.

In another aspect, the present invention provides a mobile terminal communication method, which includes displaying a plurality of Internet addresses on a first mobile terminal, selecting at least one Internet address of the plurality of Internet addresses, and transmitting a message including information related to the selected at least one Internet address to at least a second terminal.

In yet another aspect, the present invention provides a mobile terminal communication method, which includes receiving a message including information related to a specific Internet address indicating a specific web page, and displaying the message including the information related to the specific Internet address.

In still another aspect, the present invention provides a mobile communication system, which includes a first terminal configured to access a Web page of a specific Internet address using a web browser on the first mobile terminal, to enter a message input screen on which information related to the specific Internet address is automatically displayed, and to transmit a message including the information related to the specific Internet address, and a second mobile terminal configured to receive the message transmitting from the first terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
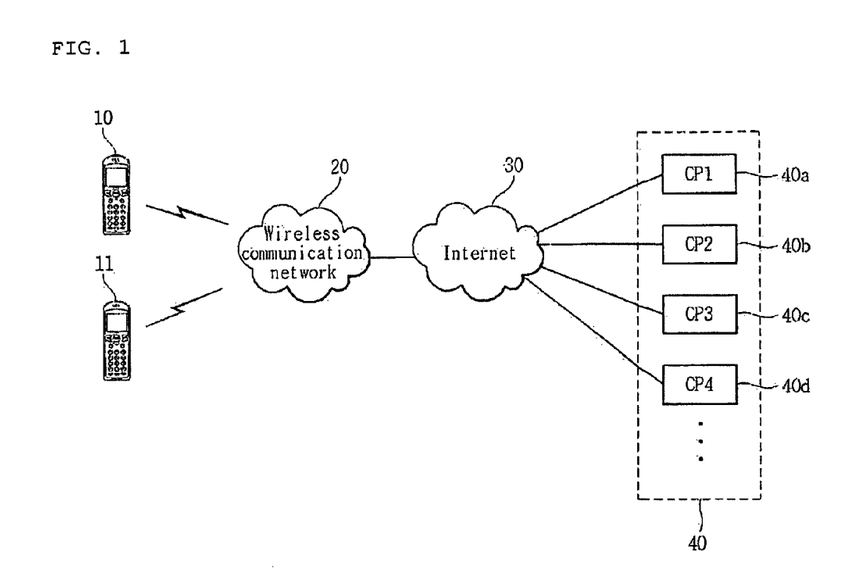
FIG. 1 is an overview illustrating a mobile communication system according to an embodiment of the present invention.

Turning first to FIG. 1, which is an overview illustrating a mobile communication system according to an embodiment of the present invention. As shown, the system includes a transmitting mobile communication terminal 10, a receiving mobile communication terminal 11, a wireless communication network 20, the Internet 30, and at least one contents providing server 40.

The wireless communication network 20 is any communication network that wirelessly transmits and receives data to and from the mobile communication terminals 10 and 11 and that transmits and receives data to and from the Internet 30 through a fixed line. For example, the wireless communication network 20 may be a mobile communication network for a connection of a call or a mobile Internet, e.g., WiBRO or WiMAX, based on IEEE 802.16 or IEEE 802.20. The mobile communication network includes the CDMA (Code Division Multiple Access) or GSM (Global System for the Mobile communication) type mobile communication networks.

The method of transmitting and receiving data to and from the Internet through the mobile communication network or the WiBRO or the WiMAX is established and thus is not described in detail. However, the present invention is applicable to any wireless communication network which is currently available or which will be available in the future.

Further, the contents providing servers 40a, 40b, 40c, and 40d include Web sites each having a different Internet address. The Web site also includes at least one Web page.

Figure 2:
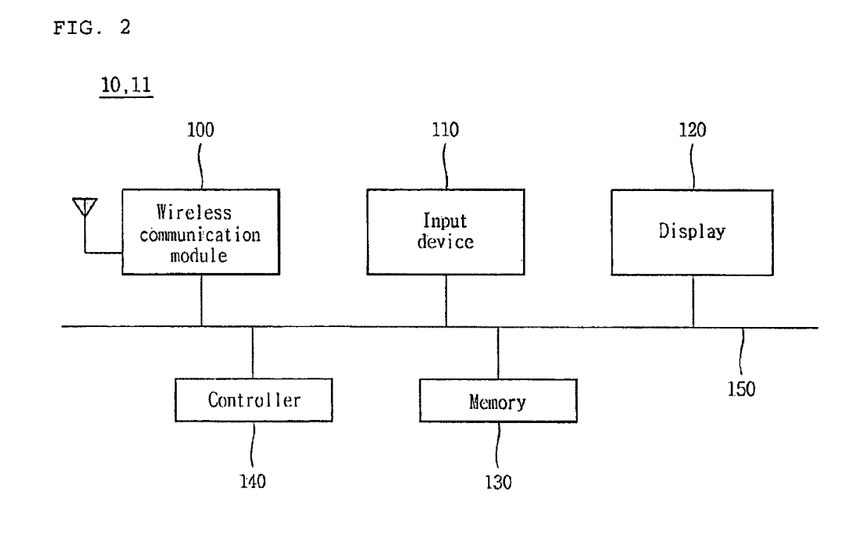
FIG. 2 is a block diagram of a mobile communication terminal according to an embodiment of the present invention.

Turning next to FIG. 2, which is a block diagram of the mobile communication terminal 10 and 11 shown in FIG. 1 according to an embodiment of the present invention. As shown, the mobile terminals 10 and 11 include a wireless communication module 100, an input device 110, a display 120, a memory 130, and a controller 140. Also included is a bus 150 used to connect these elements.

Further, the wireless communication module 100 is used to transmit and receive data to and from the wireless communication network 20. In addition, because the wireless communication network 20 is connected to the Internet 30, the wireless communication module 100 can also communicate with the Internet 30 via the wireless communication network 20.

The input device 110 receives a variety of information and instructions input by a user and can be implemented as a keypad or a touch input device with various number keys and direction keys, etc. For example, the touch input device may be a touch screen or a touch pad. In addition, the display 120 displays a state of the mobile communication terminals 10 and 11 and other information based on a control signal output from the controller 140. Further, the display 120 can be implemented as a touch screen.

The memory 130 stores programs used for controlling an overall operation of the corresponding mobile communication terminals 10 and 11, and also stores other data input by the user. For example, the memory 130 stores a web browser, which is an application that allows the user to view information fetched from the contents providing server 40 when the mobile communication terminals 10 and 11 are connected to the Internet 30. In addition, the controller 140 controls the different elements and the overall operation of the mobile communication terminals 10 and 11.

Figure 3:
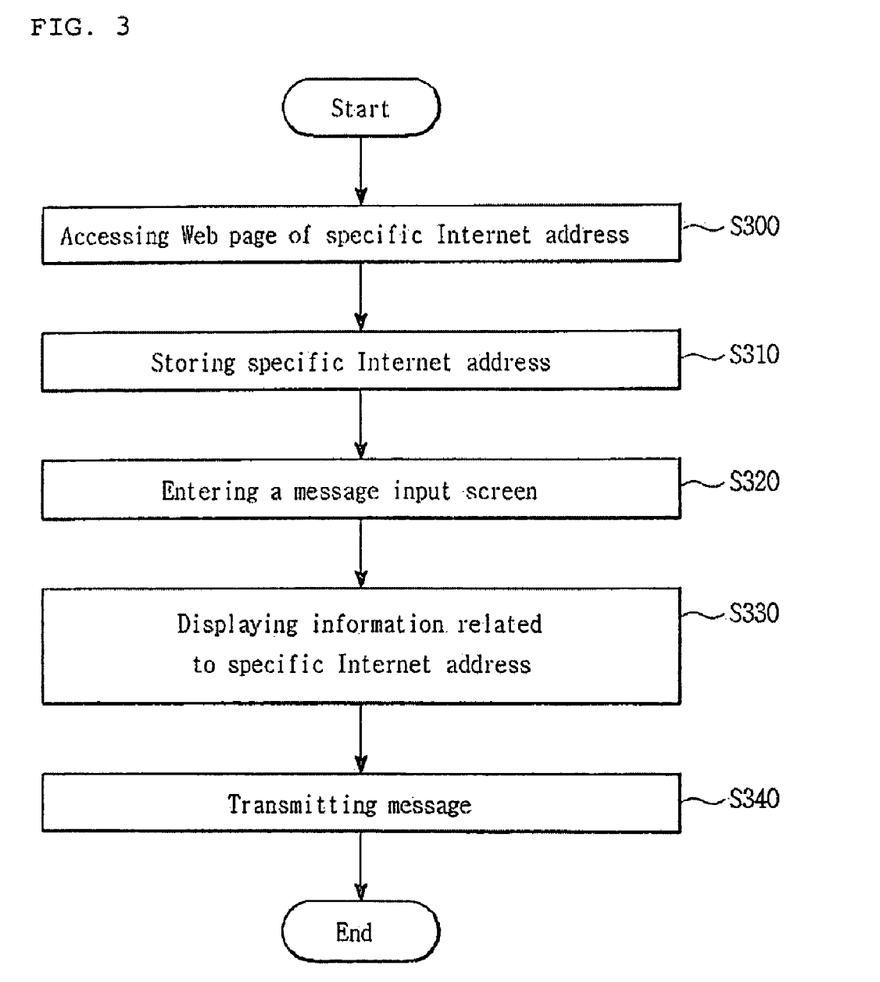
FIG. 3 is a flowchart illustrating a method of transmitting an Internet address according to an embodiment of the present invention.

Turning now to FIG. 3, which is a flowchart illustrating a method of transmitting an Internet address according to an embodiment of the present invention. FIGS. 1 and 2 will also be referred to in this description.

Figure 4:
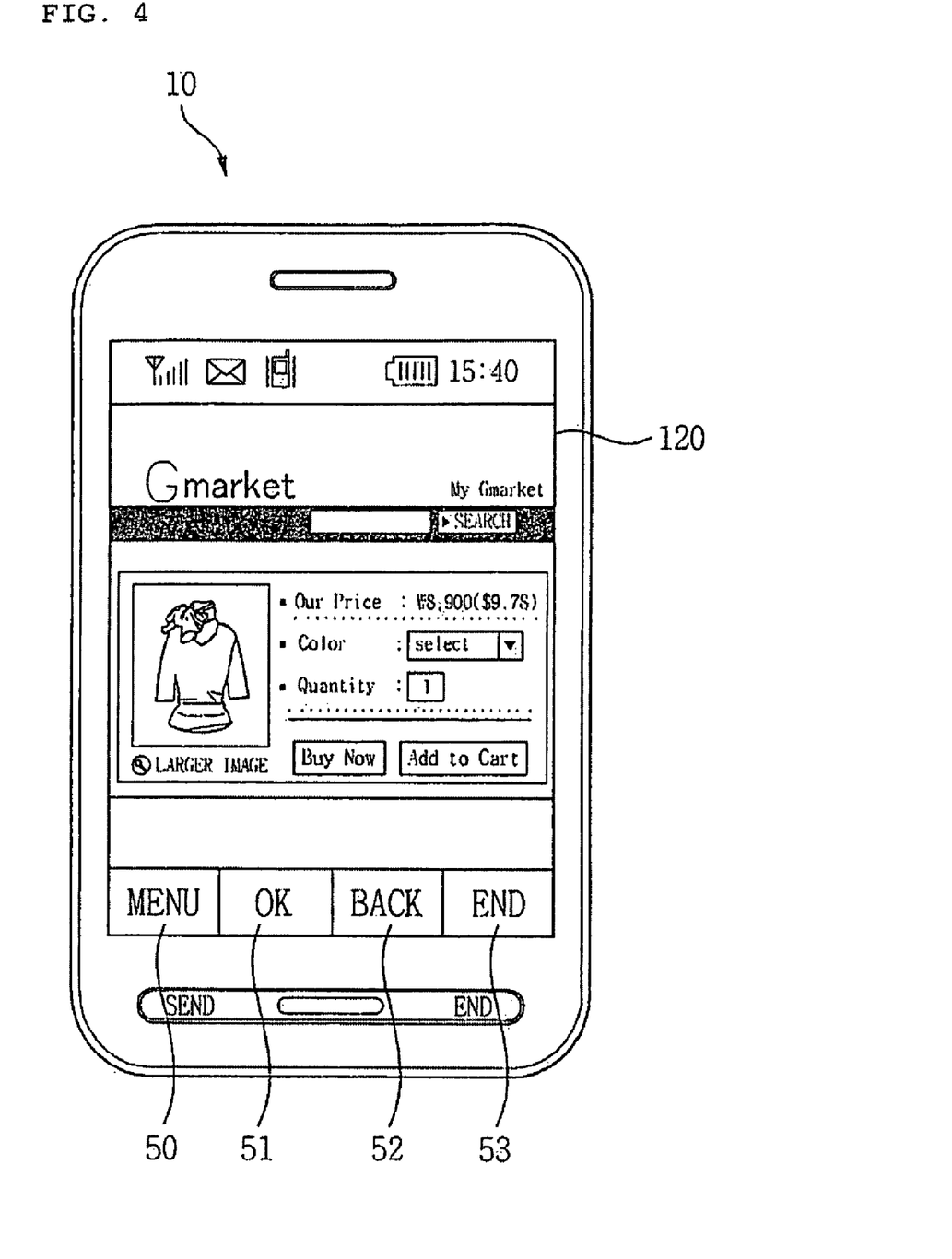
FIG. 4 is an overview illustrating a screen of a specific Web page on a web browser of a mobile terminal according to an embodiment of the present invention.

As shown, the mobile communication terminal is first connected to a Web page of a specific Internet address on the web browser (S300). FIG. 4 is an overview illustrating an example of a screen of a specific web page being displayed on the terminal 10. As shown in FIG. 4, the screen image includes a MENU button 50, an OK button 51, a BACK button 52 and an END button 53.

Figure 5:
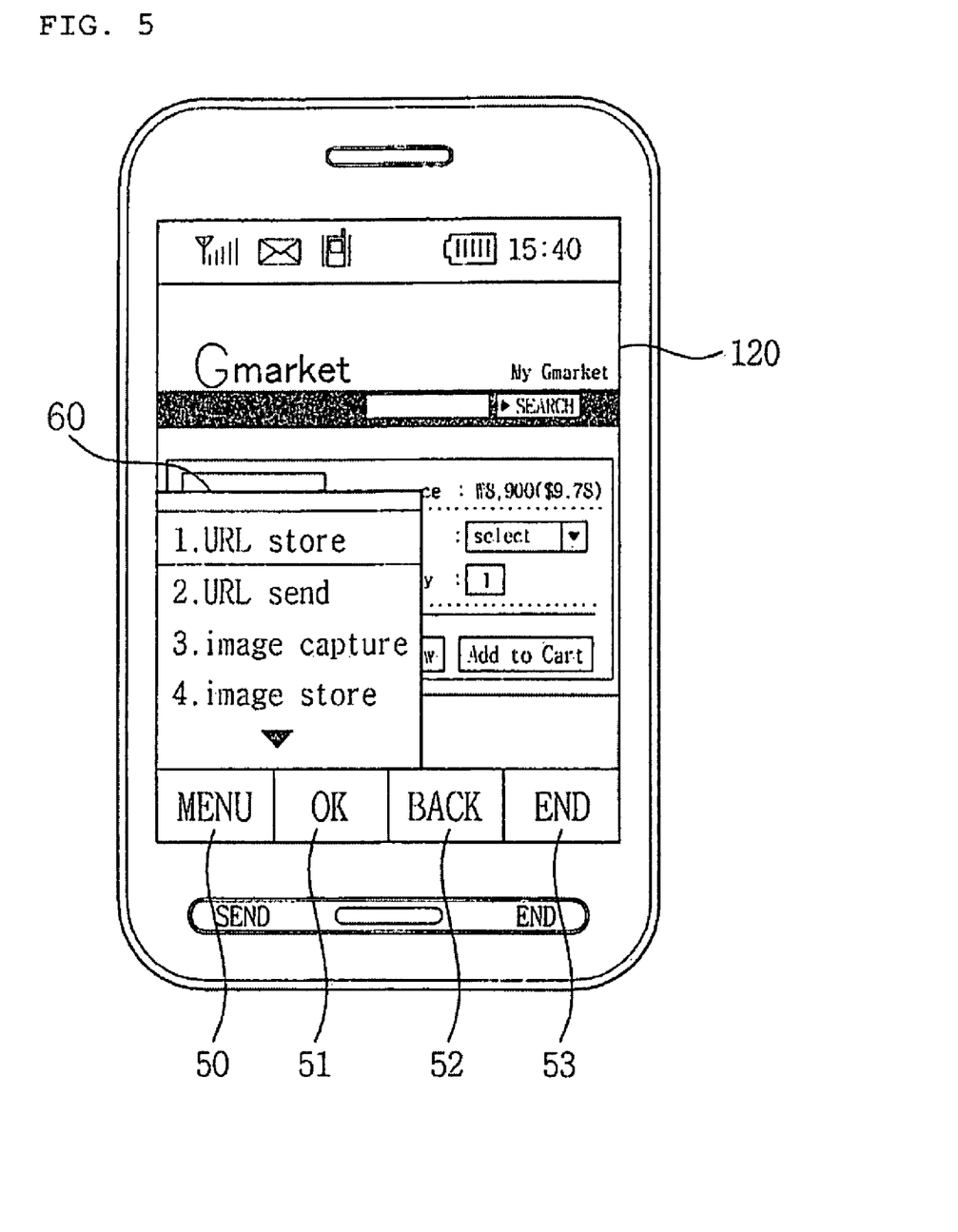
FIG. 5 is an overview illustrating a menu window on a web browser of a mobile terminal according to an embodiment of the present invention.

In more detail, when the MENU button 50 is selected, a menu window including at least one selectable menu item is displayed. For example, FIG. 5 is an overview illustrating a menu window on a web browser of a mobile terminal according to an embodiment of the present invention. In more detail, the menu window in FIG. 5 includes the options of 1) storing the URL (Uniform Resource Locator) corresponding to the displayed web page, 2) transmitting the URL to another terminal, 3) capturing the displayed web page as an image, and 4) storing a captured image of the web page.

Further, the OK button in FIGS. 3-5 can be selected by the user to select particular contents provided on the Web page or to select a highlight menu item. The BACK button 52 can be used to return to a previously displayed Web page.

As discussed above with respect to FIG. 5, the user can store and transmit a URL of the displayed web page. The URL identifies the web page such that when the URL is selected, the corresponding web page is automatically displayed. A URI (Uniform Resource Identifier) may also be used instead of the URL. Further, the Internet address of the web page includes, for example, an IP (Internet Protocol) address. That is, the IP address is a unique address for discriminating sender and receiver terminals using TCP (Transmission Control Protocol)/IP.

Thus, returning to the flowchart of FIG. 3, after the user accesses a particular web page, the Internet address corresponding to the accessed web page is stored in an Internet address list in the memory 130 (S310). That is, the Internet address list includes at least one Internet address. For example, when the menu item '1. URL store' is selected in the menu window 60 shown in FIG. 5, the Internet address of the Web page currently being displayed on the display 120 is stored in the Internet address list.

Further, in step S310, supplementary information related to the specific Internet address can also be stored in the Internet address list. That is, the supplementary information related to the specific Internet address can be, for example, a title of the Web page indicated by the specific Internet address or an image representing the Web page.

Next, in FIG. 3, the user of the terminal enters a message input screen for inputting a specific type of message (S320). That is, the message type includes, for example, a short message service (SMS), a multimedia message service (MMS), an e-mail, an Instant Message (IM) service, etc. Further, it is also possible for the user to set a default message type such that the default message type is always used when transmitting messages including the Internet address.

Figure 6:
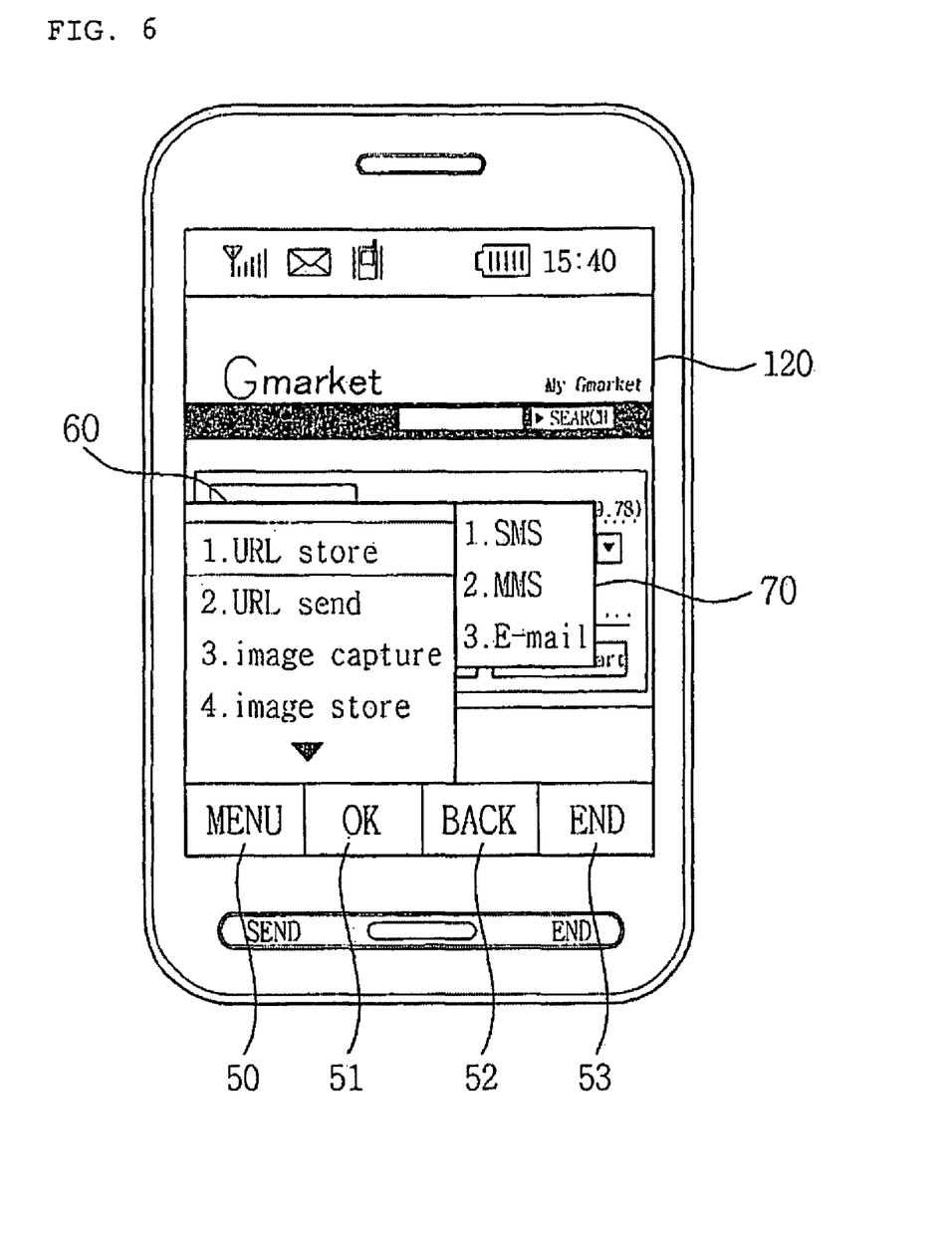
FIG. 6 is an overview illustrating a screen for selecting a message type according to an embodiment of the present invention.

Alternatively, as shown in FIG. 6, when the user selects '2. URL send' from the menu window 60 in FIG. 5, a message type select window 70 is displayed. Then, the user can select one of multiple items displayed on the message type select window 70. For example, when the user selects '1. SMS' from the message type select window 70 in FIG. 6, message input screens shown in FIG. 7A or 7B are displayed.

Figure 7:
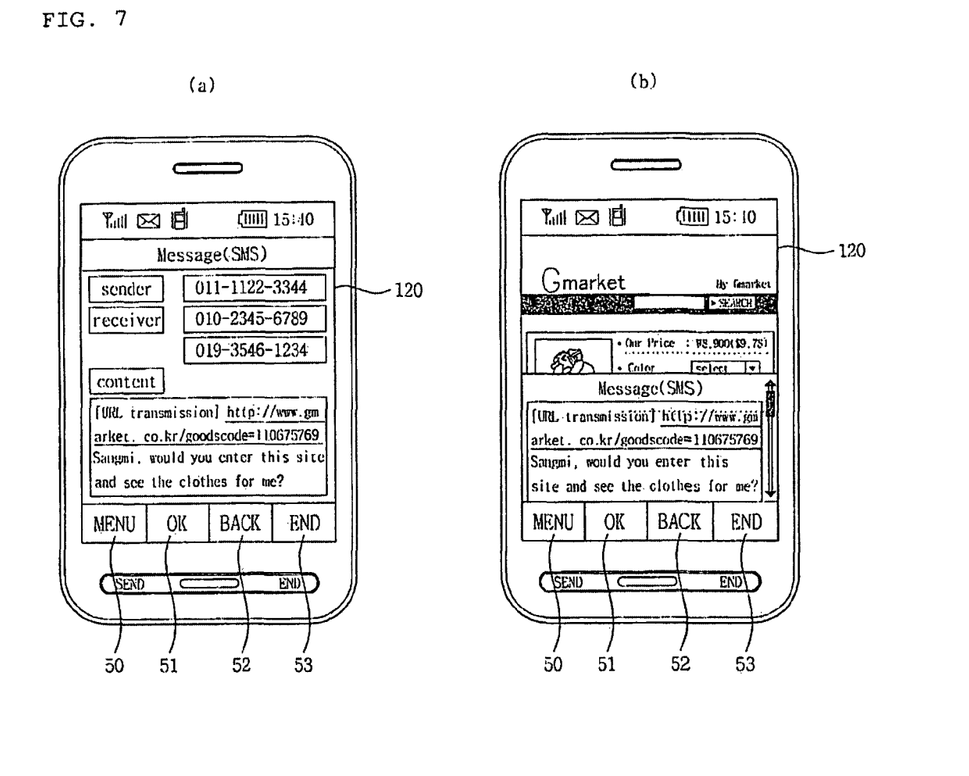
FIGS. 7A and 7B are overviews illustrating message input screens according to an embodiment of the present invention.

In more detail, FIG. 7A illustrates the Web page shown in FIG. 6 being replaced with the input options (sender telephone number, receiver telephone number, URL link, and text input by the user). That is, the Web page shown is FIG. 6 is not displayed. FIG. 7B illustrates the message input screen being displayed in an overlapping manner on the Web page shown in FIG. 6. Namely, in FIG. 7B, the controller 140 divides the display region of the display 120 into two parts and displays the Web page on one part and the message input screen on the other part.

Further, rather than the user entering the type of messaging service to use, the controller 140 can also determine what type of messaging service to use based on a size of the data to be transmitted. That is, the transmission service is automatically determined without the user's intervention. For example, when the amount of data corresponding to the specific Internet address can be sufficiently covered using the SMS, the controller 140 can automatically determine the messaging service to be the SMS. Alternatively, the controller 140 may determine the message type be the MMS or e-mail.

In addition, when the message input screen is entered in step S320 of FIG. 3, the controller 140 automatically displays information related to the specific Internet address on the message input screen (S330). The information related to the specific Internet address can be, for example, at least one of the specific Internet address, a title of the Web page indicated by the specific Internet address, and an image representing the Web page.

Figure 8:
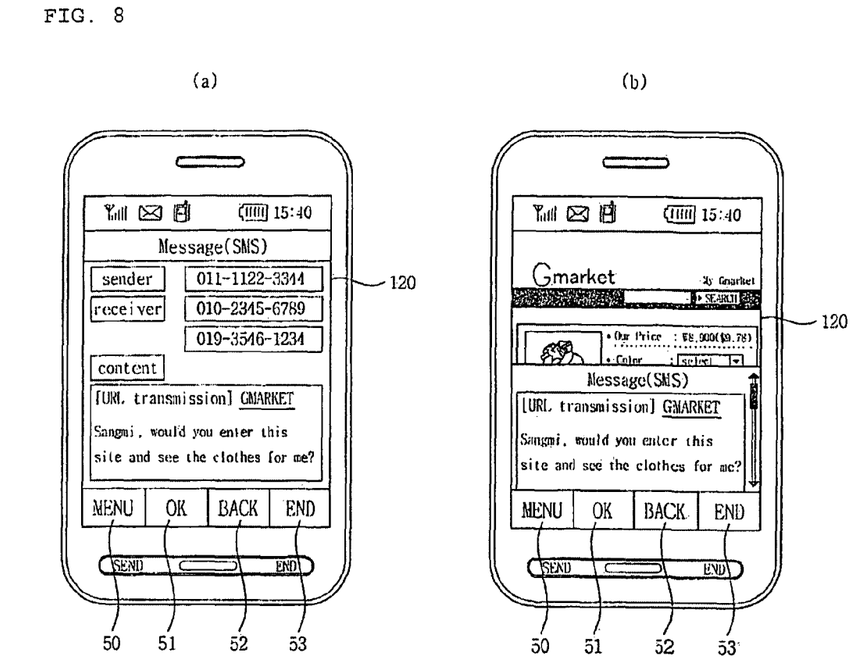
FIGS. 8A and 8B are overviews illustrating message input screens showing a title of a Web page according to an embodiment of the present invention.
Figure 9:
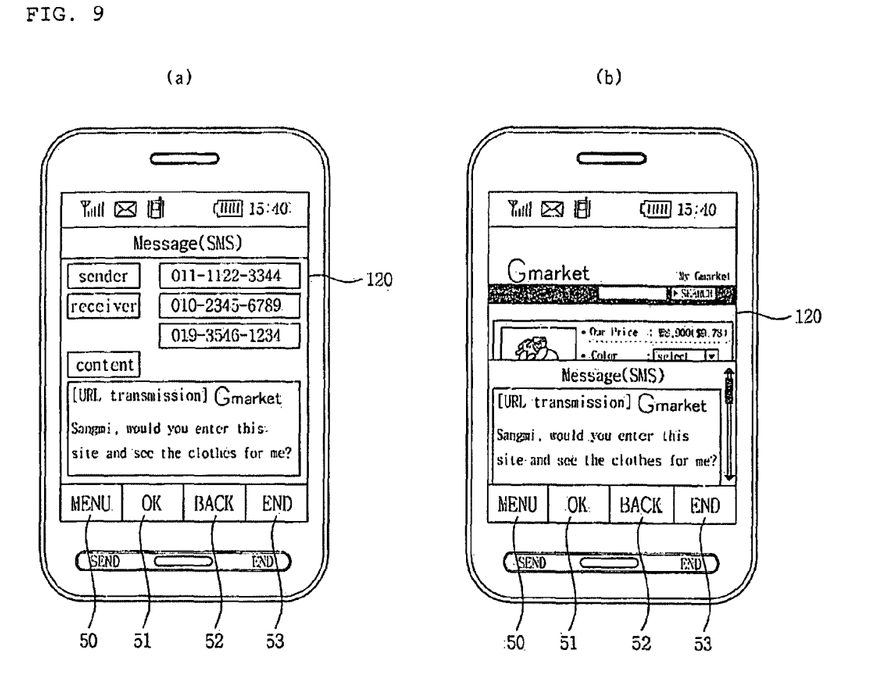
FIGS. 9A and 9B are overviews illustrating message input screens showing the title and an image of the Web page according to an embodiment of the present invention.

Further, the title of the Web page and the image representing the Web page can be provided by the accessed Web page or can be directly inputted by the user of the mobile communication terminal 10. For example, the image input screens in FIGS. 7A and 7B show the specific Internet address itself. FIGS. 8A and 8B illustrate examples of the message input screens showing the title of a Web page. FIGS. 9A and 9B illustrate examples of the message input screens showing the title of the Web page as an image.

Then, in FIG. 3, the controller 140 transmits a message including the information related to the specific Internet address to at least one other terminal through the wireless communication module 100 (S340). The transmitted message may also include a certain identifier indicating that the message is data corresponding to the Internet address-related information. Then, the user of the other terminal can recognize that the transmitted message corresponds to an Internet address-related message.

In addition, the transmitting step S340 may also transmit a captured screen image of the Web page. Further, at least one image provided from the connected Web page may be stored and transmitted to the other terminal.

A method of transmitting an Internet address according to another embodiment of the present invention will now be described with reference to the flowchart shown in FIG. 10. FIGS. 1 and 2 will also be referred to in this description. As shown, the user of the mobile terminal 10 first enters a message input screen for inputting a specific type of message (S400). The transmission message service can be, for example, an SMS, an MMS, an e-mail or an IM.

In addition, step S400 can be performed in various situations. In more detail, step S400 can be performed in a state that the mobile communication terminal 10 is connected with a specific Web page. For example, when the mobile communication terminal 10 is connected with the specific Web page as shown in FIG. 4, step S400 can be performed when the MENU button 50 is selected and the item '2. URL send' displayed in the menu window 60 is also selected.

Alternatively, step S400 can be performed by searching a message-related menu when the mobile communication terminal 10 is in an idle mode. In this instance, the mobile communication terminal 10 provides the message-related menu for transmitting the information related to the Internet address as an independent menu according to an embodiment of the present invention.

Figure 10:
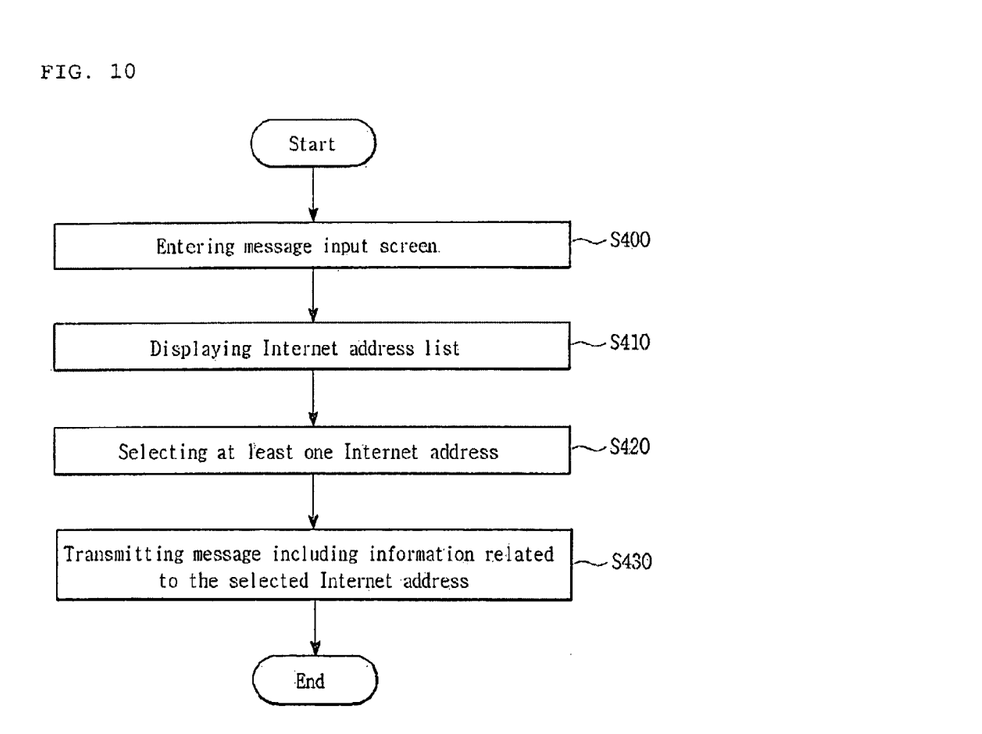
FIG. 10 is a flowchart illustrating a method of transmitting an Internet address according to another embodiment of the present invention.

Next, in FIG. 10, the controller 140 displays a list including at least one Internet address (S410). Further, step S410 can be automatically performed when step S400 is performed. Alternatively, step S410 can be performed based on a user instruction after step the S400 is performed. Further, FIGS. 11A and 11B illustrate examples of message input screens showing Internet address lists according to an embodiment of the present invention.

Figure 11:
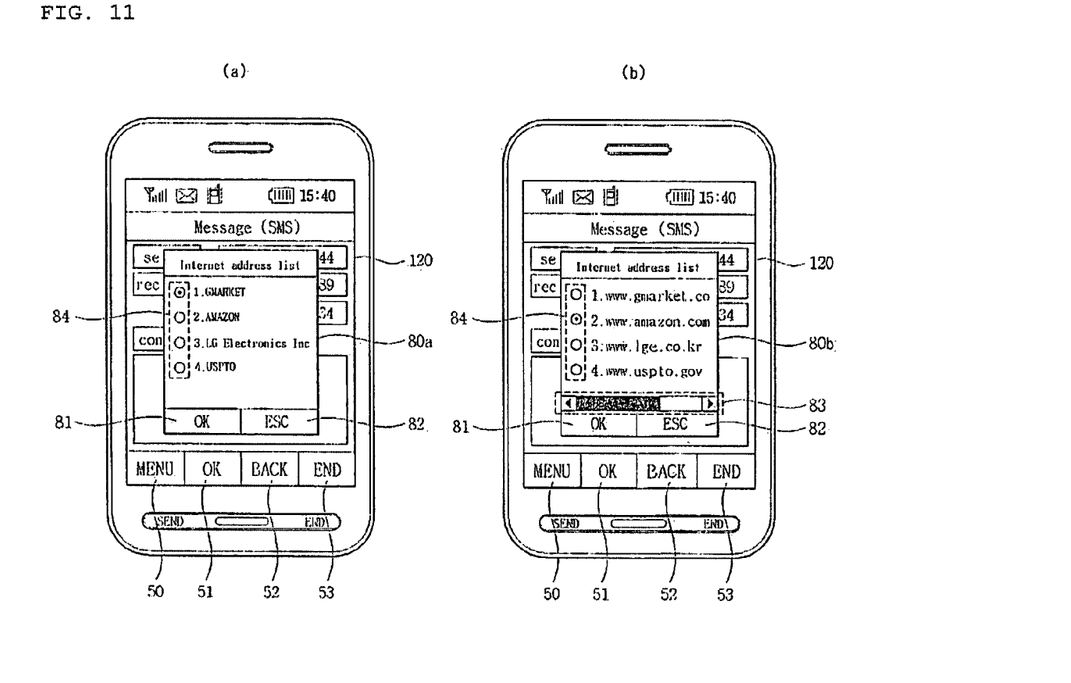
FIGS. 11A and 11B are overviews illustrating message input screens showing Internet address lists according to an embodiment of the present invention.

In more detail, FIG. 11A illustrates a displayed Internet address list 80a including titles of Web pages, and FIG. 11B illustrates a displayed Internet address list 80b including the actual Internet addresses. Further, reference numeral 83 in FIG. 11B denotes a scroll region allowing the user to scroll data left and right in the Internet address list 80b. Reference numeral 82 refers to an ESC (escape) button that the user can select to escape out of the Internet list window 80b (i.e., to close the window 80b).

In addition, the list of Internet addresses may be previously stored by the user. Alternatively, the list may be generated by a company the user previously purchased something from. For example, if the user recently purchased a CD of a particular artist, the list may include other Internet addresses of artists that the user may also be interested in purchasing.

Then, in FIG. 10, the user selects at least one Internet address from the list (S420). For example, the user may select at least one Internet address from the Internet address lists 80a and 80b. Further, the reference numeral 84 refers to a region in the window 80a that illustrates whether or not an Internet address is selected. Therefore, when the step S420 is performed, the controller 140 displays the selected at least one Internet address on the message input screen as shown in FIGS. 7A or 7B.

Then, the user may input any remaining information in the message input window that he or she wants to transmit with the Internet address. Then, in step S430, the controller 140 transmits the message including the information related to the selected at least one Internet address to at least one other terminal through the wireless communication module 100. Note that step S430 in FIG. 10 is similar to the step S340 in FIG. 3, and thus a detailed explanation of step S430 will not be repeated.

Figure 12:
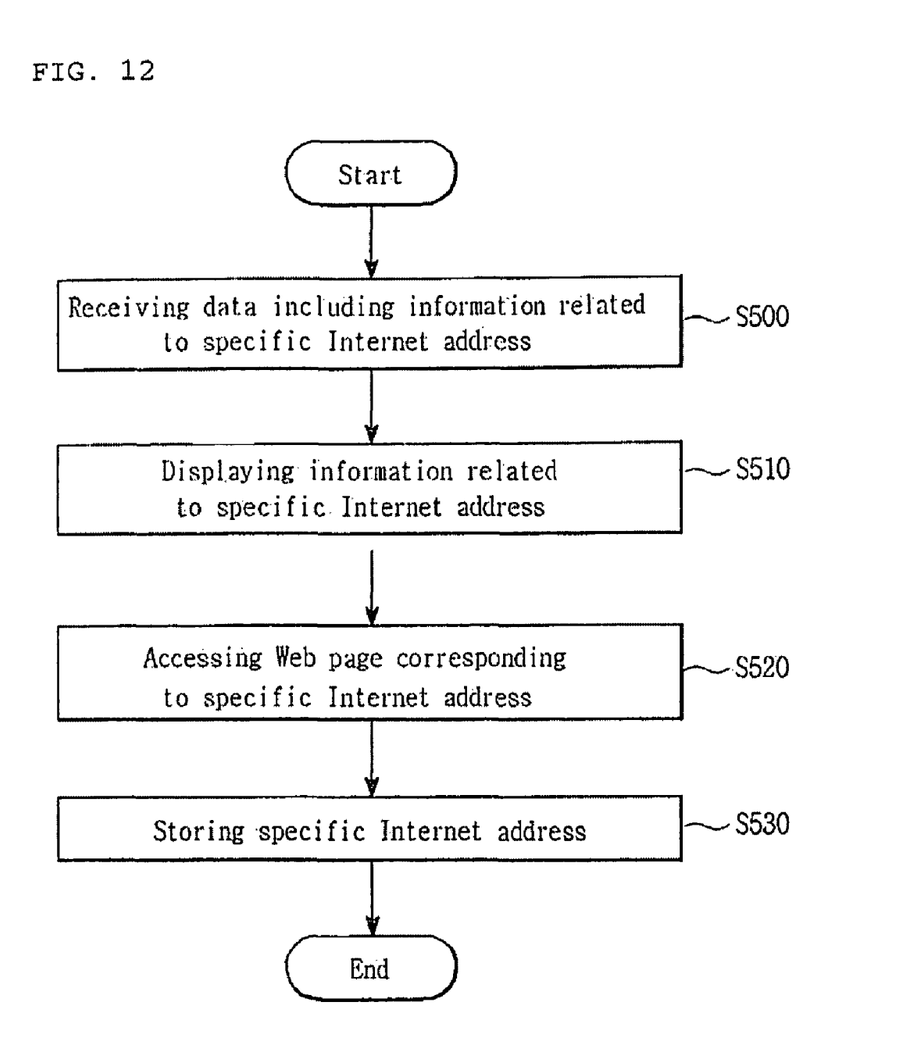
FIG. 12 is a flowchart illustrating a method of receiving an Internet address according to an embodiment of the present invention.

Turning next to FIG. 12, which is a flowchart illustrating a method of receiving an Internet address according to an embodiment of the present invention. FIGS. 1 and 2 will also be referred to in this description. The mobile terminal 11 in FIG. 1 will be referred to as the receiving mobile terminal.

As shown in FIG. 12, the mobile communication terminal 11 receives data including information related to a specific Internet address indicating a specific Web page (S500). The information related to the specific Internet address is the same as that described above according to the Internet address transmitting method. That is, for example, the information related to the specific Internet address includes at least one of the specific Internet address, the title of the specific Web page, the image representing the specific Web page, the captured image of the specific Web page, an image provided by the specific Web page, etc.

Figure 13:
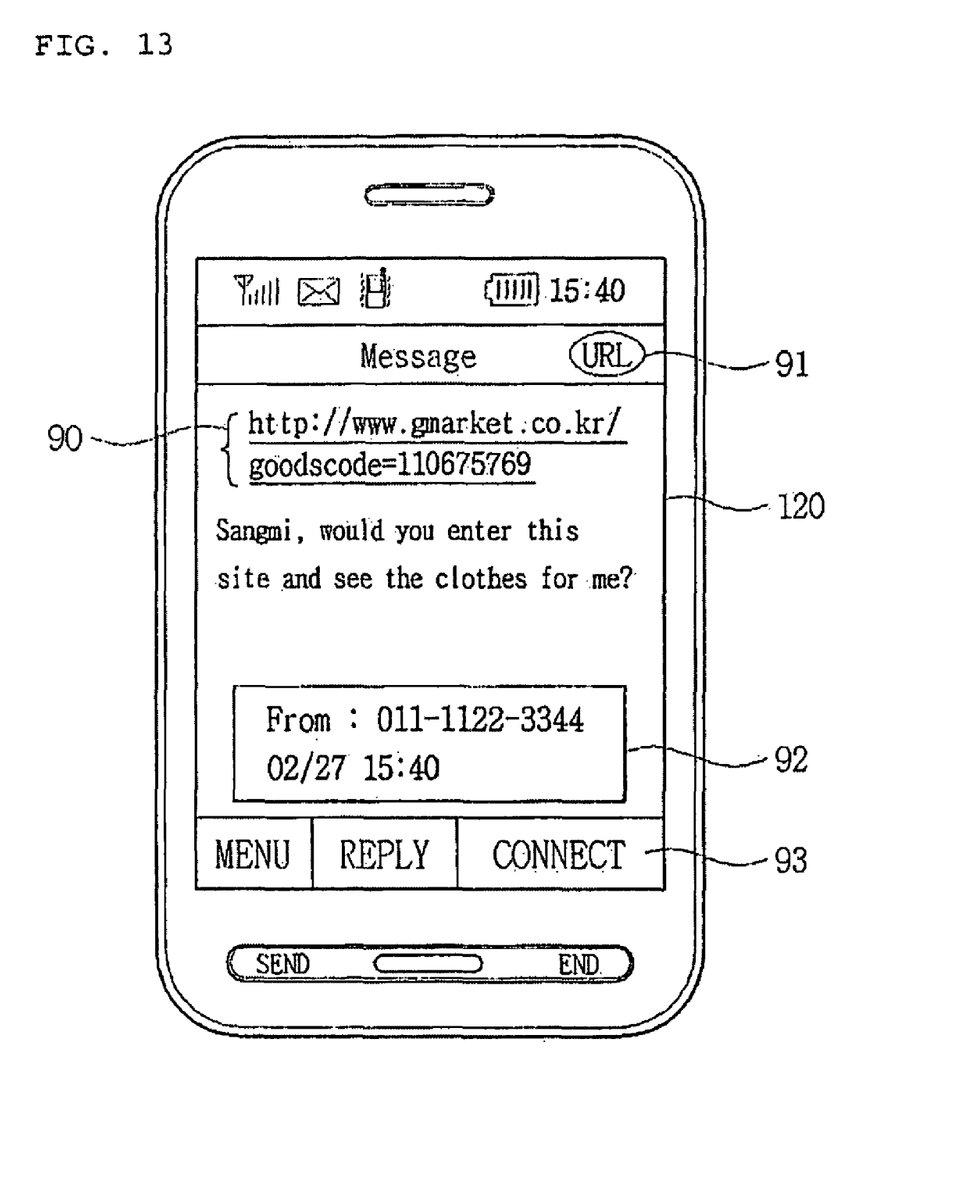
FIGS. 13 and 14 are overviews illustrating Internet address reception screens according to an embodiment of the present invention.
Figure 14:
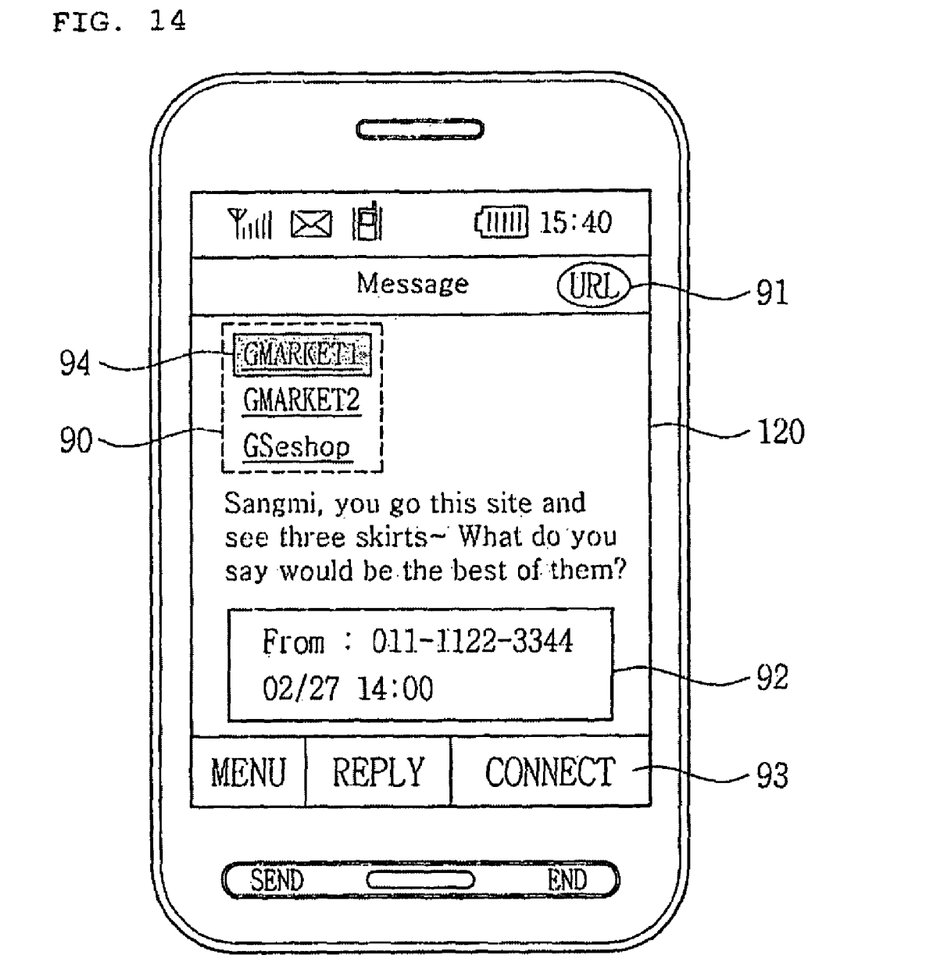

Then, in FIG. 12, the controller 140 of the receiving terminal 11 displays the information related to the specific Internet address on the display 120 (S510). In more detail, FIGS. 13 and 14 illustrate examples of Internet address reception screens according to an embodiment of the present invention. In addition, the user may manipulate, select, etc, information shown in the reception screens using the input device 110.

As shown in FIGS. 13 and 14, the reception messages include information related to the specific Internet address. In more detail, reference numeral 90 denotes the information corresponding to the specific Internet address included in the received message. That is, FIG. 13 shows the specific Internet address itself, and FIG. 14 shows titles 94 of three specific Web pages. In addition, the titles 94 of the three specific Web pages are matched or linked to specific Internet addresses, respectively.

In addition, the reference numeral 91 is an identifier indicating that the reception message includes the information related to the Internet address. Therefore, the user can recognize that the reception message includes the information related to the Internet address based on the identifier 91. Further, an identifier may also be displayed to indicate a type of message of a reception message list. For example, reference numeral 92 in FIG. 13 denotes caller identification (sender identification) information such as a phone number or a name of a caller (sender) and an arrival time (or origination time) of the reception message.

Then, in FIG. 12, the user can access the displayed Internet address/title, etc. to access the corresponding Web page. That is, when the user selects or clicks on the link corresponding to the Web page, the controller 140 drives the web browser on the receiving terminal 11 to access the specific Web page corresponding to the specific Internet address (S520). For example, the user can select the 'CONNECT' button 93 in FIG. 13 to access the specific Web page corresponding to the specific Internet address 90. The user can also double click the information of the specific Internet address.

In addition, as discussed above, FIG. 14 illustrates a message including information related to a plurality of Internet addresses. Therefore, in this instance, the user can select one of the titles corresponding to the Internet addresses using the input device 110. Further, the reference numeral 94 in FIG. 14 also illustrates a currently selected Web page. For example, when the input device 110 includes a keypad, the user can manipulate a direction key of the keypad to shift the indicator 94 to indicate any one of the displayed multiple Web pages. In addition, when the input device 110 and the display 120 are implemented as a touch screen, the user can simply touch the screen at a position corresponding to the desired Web page title to select that particular Web page.

Therefore, in the above-described embodiment, the receiving mobile communication terminal 11 can be connected to the Web page corresponding to the specific Internet address transmitted from the transmitting mobile communication terminal 10. Accordingly, the transmitting and receiving mobile communication terminals 10 and 11 can transmit and receive data including the information related to the specific Internet, to thereby provide a same Web page to both users at almost the same time.

Then, in FIG. 12, the user of the receiving terminal 11 can store the transmitted Internet address an Internet address list (S530). That is, the Internet address list can be stored in the memory 130 of the receiving terminal 11. Step S530 can be automatically performed without user intervention or based on a specific request or input by a user of the receiving terminal 11.

As described above, the method of transmitting and receiving information corresponding to an Internet address between the mobile communication terminals according to the present invention has several advantages.

That is, first, because the Internet addresses can be transmitted and received between mobile communication terminals, both users can conveniently share the Internet-related information. Second, a user interface for transmitting and receiving the Internet address is provided between the multiple mobile communication terminals.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:
1. A method of controlling a mobile terminal, the method comprising:
  accessing, via a wireless communication unit, a specific Internet address using a web browser on the mobile terminal;
  displaying, on a touchscreen display on the mobile terminal, a display window including viewable multimedia contents corresponding to the specific Internet address;
  displaying, on the touchscreen display, a selectable option to transmit information related to the multimedia contents to at least one other terminal;
  receiving, via the touch screen display, a selection signal indicating a selection of the selectable option;
  replacing, via a controller on the mobile terminal, the displaying of the display window including the multimedia contents with a display window including a message input screen on which the information related to the multimedia contents is automatically included; and
  transmitting, via the wireless communication unit, a message including the information related to the multimedia contents to the at least one other terminal,
  wherein a title of the multimedia contents and an Internet address of the multimedia contents are automatically displayed in the replaced message input screen without user interaction,
  wherein a type of messaging service for transmitting the message is automatically determined without user interaction based on a transmission amount of the information related to the multimedia contents,
  wherein the type of messaging service includes at least one of a short message service (SMS), a multimedia message service (MMS), an e-mail service and instant messaging service (IMS) provided on the mobile terminal,
  wherein destination information of the at least one other terminal is an email address of a sharing partner,
  wherein the email address is directly entered by the user or selected from a contacts list of the user on the mobile terminal, and
  wherein the information related to the multimedia contents includes the destination information, the title of the multimedia contents and the Internet address of the multimedia contents.
2. The method of claim 1, further comprising:
  storing the Internet address of the multimedia contents in an Internet address list in a memory of the mobile terminal.
3. The method of claim 1, wherein the information related to the multimedia contents comprises an image representing the multimedia contents.
4. The method of claim 1, wherein the transmitted message comprises an identifier indicating that the transmitted message includes the information related to the multimedia contents.
5. The method of claim 1, wherein the list of multimedia contents comprises a list of movies or videos that can be viewed.
6. The method of claim 1, wherein the list of multimedia contents comprises movies or videos that are currently being viewed.
7. The method of claim 1, wherein the list of multimedia contents comprises a newspaper article.
8. A mobile terminal, comprising:
  a wireless communication unit configured to access a specific Internet address using a web browser on the mobile terminal;

a touchscreen display configured to display a display window including viewable multimedia contents corresponding to the specific Internet address, to display a selectable option to transmit information related to the multimedia contents to at least one other terminal, and to receive a selection signal indicating a selection of the selectable option; and a controller configured to replace the displaying of the display window including the multimedia contents with a display window including a message input screen on which the information related to the multimedia contents is automatically included, and to control the wireless communication unit to transmit a message including the information related to the multimedia contents to the at least one other terminal, wherein the controller is further configured to automatically display a title of the multimedia contents and an Internet address of the multimedia contents in the replaced message input screen without user interaction, wherein a type of messaging service for transmitting the message is automatically determined without user interaction based on a transmission amount of the information related to the multimedia contents, wherein the type of messaging service includes at least one of a short message service (SMS), a multimedia message service (MMS), an e-mail service and instant messaging service (IMS) provided on the mobile terminal, wherein destination information of the at least one other terminal is an email address of a sharing partner, wherein the email address is directly entered by the user or selected from a contacts list of the user on the mobile terminal, and wherein the information related to the multimedia contents includes the destination information, the title of the multimedia contents and the Internet address of the multimedia contents.

9. The mobile terminal of claim 8, further comprising:
a memory configured to store the Internet address of the multimedia contents in an Internet address list of the mobile terminal.

10. The mobile terminal of claim 8, wherein the information related to the multimedia contents comprises an image representing the multimedia contents.

11. The mobile terminal of claim 8, further comprising:
a camera configured to capture an image of the accessed multimedia contents,
wherein the transmitted message comprises the captured image.

12. The mobile terminal of claim 8, further comprising:
a memory configured to store at least one image corresponding to the accessed multimedia contents,
wherein the transmitted message comprises the stored at least one image.

13. The mobile terminal of claim 8, wherein the transmitted message comprises an identifier indicating that the transmitted message includes the information related to the multimedia contents.

14. The mobile terminal of claim 8, wherein after entering the message input screen, the wireless communication unit is further configured to access another multimedia contents of another specific Internet address using the web browser on the mobile terminal, and add the another specific Internet address to the information in the message input screen.

15. The mobile terminal of claim 8, wherein the list of multimedia contents comprises a list of movies or videos that can be viewed.

16. The mobile terminal of claim 8, wherein the list of multimedia contents comprises movies or videos that are currently being viewed.

17. The mobile terminal of claim 8, wherein the list of multimedia contents comprises a newspaper article.

18. A mobile communication system, comprising:
a first mobile terminal including a wireless communication unit configured to access a specific Internet address using a web browser on the first mobile terminal, a touchscreen display configured to display a display window including viewable multimedia contents corresponding to the specific Internet address, to display a selectable option to transmit information related to the multimedia contents to at least a second terminal, and to receive a selection signal indicating a selection of the selectable option; and a controller configured to replace the displaying of the display window including the multimedia contents with a display window including a message input screen on which the information related to the multimedia contents is automatically included, and to control the wireless communication unit to transmit a message including the information related to the multimedia contents to the at least second terminal, wherein the controller is further configured to automatically display a title of the multimedia contents an Internet address of the multimedia contents in the replaced message input screen without user interaction, wherein the at least second terminal includes a communication unit configured to receive the message transmitting from the first terminal and a display configured to display the received message including the multimedia contents, wherein a type of messaging service used for transmitting the message is automatically determined without user interaction based on a transmission amount of the information related to the multimedia contents, wherein the type of messaging service includes at least one of a short message service (SMS), a multimedia message service (MMS), an e-mail service and instant messaging service (IMS) provided on the mobile terminal, wherein destination information of the at least second terminal is an email address of a sharing partner, wherein the email address is directly entered by the user or selected from a contacts list of the user on the mobile terminal, and wherein the information related to the multimedia contents includes the destination information, the title of the multimedia contents and the Internet address of the multimedia contents.

19. The system of claim 18, further comprising:
a web server configured to provide the multimedia contents to the first and second mobile terminals.

20. The system of claim 18, wherein the information related to the multimedia contents further comprises an image representing the multimedia contents.

21. The system of claim 18, wherein the first terminal captures an image of the accessed multimedia contents, and the transmitted message comprises the captured image.

22. The system of claim 18, wherein the first terminal stores at least one image corresponding to the multimedia contents, and the transmitted message comprises the stored at least one image.

23. The system of claim 18, wherein the transmitted message comprises an identifier indicating that the transmitted message includes the information related to the multimedia contents.

24. The system of claim 18, wherein the list of multimedia contents comprises a list of movies or videos that can be viewed.

25. The system of claim 18, wherein the list of multimedia contents comprises movies or videos that are currently being viewed.

26. The system of claim 18, wherein the list of multimedia contents comprises a newspaper article.

\* \* \* \* \*